No. 684,979. Patented Oct. 22, 1901.
E. DITHRIDGE.
MANUFACTURE OF ENAMEL.
(Application filed Dec. 6, 1900.)
(No Model.)
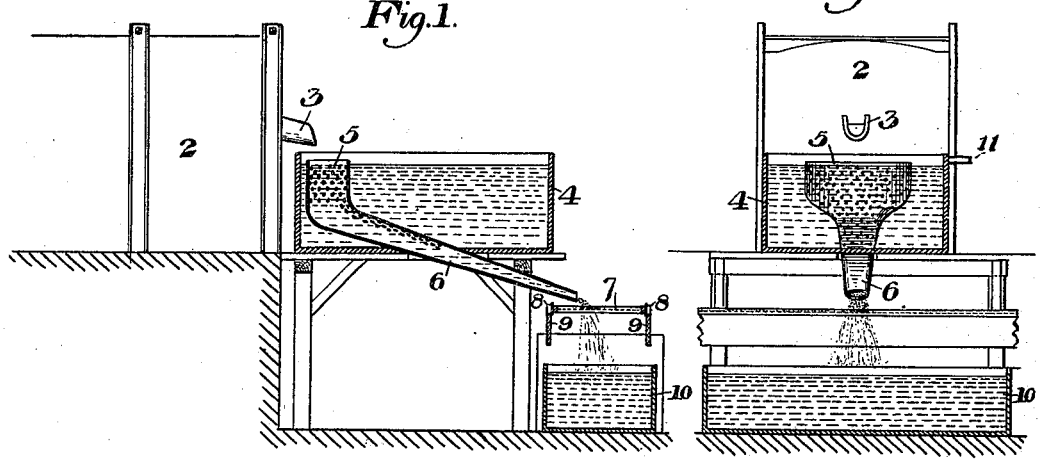
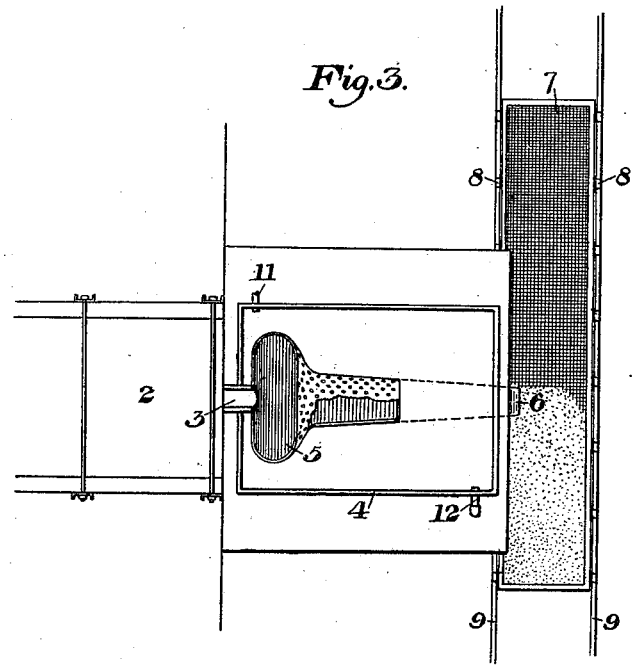
WITNESSES
INVENTOR

UNITED STATES PATENT OFFICE.

EDWARD DITHRIDGE, OF ELWOOD CITY, PENNSYLVANIA.

MANUFACTURE OF ENAMEL.

SPECIFICATION forming part of Letters Patent No. 684,979, dated October 22, 1901.

Application filed December 6, 1900. Serial No. 38,953. (No model.)

*To all whom it may concern:*

Be it known that I, EDWARD DITHRIDGE, of Elwood City, Lawrence county, Pennsylvania, have invented a new and useful Improvement in the Manufacture of Enamel, of which the following is a full, clear, and exact description, reference being had to the accompanying drawings, forming part of this specification, in which—

Figure 1 is a sectional side elevation of apparatus constructed in accordance with my invention. Fig. 2 is a sectional front elevation of the same, and Fig. 3 is a top plan view partly broken away.

My invention relates to the comminuting of fused enamel and similar substances, and is designed to provide apparatus whereby the comminuting and drying may be rapidly and cheaply carried out.

In the drawings, 2 represents a melting furnace or receptacle, in which the enamel is fused or retained at a high heat and from which it is tapped through a spout 3.

4 is a wooden tank located beneath the spout upon suitable framework and containing a metallic vessel 5, provided with a gradually-tapering covered spout 6, which extends downwardly in an inclined position through the bottom of the water-tank. Beneath the lower end of the spout or trough is a screen 7, which is mounted on a frame carried on rollers 8, moving on a track 9. The screen is preferably of considerable length, so that it may be moved along under the spout as the enamel is received upon it, and beneath that portion of the track in front of the spout is a tank 10 to receive the water draining from the enamel through the screen.

11 and 12 are suitable inlet and overflow pipes for the tank 4, by which the water may be maintained at any desired level therein.

The upper part of the receiver or vessel 5 is provided with perforations, preferably for about a half or three-fourths of its height, and that portion of the spout which is within the tank is also preferably perforated in its top portion.

In using my improved apparatus the fused enamel being tapped out through the spout 3 will fall into the water passing into the receiver 5 and the mingled water and enamel will flow down through the inclined spout and pass out upon the screen. The water will drain through the screen into the tank beneath, and as the water is quickly removed from the granulated enamel this enamel will contain sufficient heat to dry quickly in the air without the necessity of any additional heat.

The advantages of my invention will be apparent to those skilled in the art, since the operation may be practically continuous, and the heat of the broken-up pieces of enamel is utilized in drying them.

Many variations may be made in the form and arrangement of the receiver for the enamel, the means for supplying water to the enamel therein, and in the other parts of the apparatus without departing from my invention.

I claim—

1. In apparatus for comminuting molten substances, a receptacle to contain the molten material, a spout leading therefrom, a water-tank, a vessel within the water-tank arranged to receive the molten material and having an outlet-spout, and means for supplying water from the water-tank to the interior of the vessel as the molten material is poured into it; substantially as described.

2. In enamel-comminuting apparatus, a water-tank, a perforated vessel or receiver within the water-tank having a spout leading outwardly from it, and a screen upon which the spout discharges; substantially as described.

3. In comminuting apparatus, a water-tank, a receiver within, and having perforations communicating with the interior of the tank, an inclined spout leading from the receiver, a screen upon which the spout discharges, and a tank beneath the screen; substantially as described.

4. In comminuting apparatus, a water-tank, a perforated receiver within the tank and having a perforated spout extending through the tank, and a screen upon which the spout discharges; substantially as described.

5. In apparatus for comminuting molten material, a receptacle to contain the molten material, a spout leading therefrom, a water-tank containing a perforated vessel located beneath the spout, and an outlet-spout leading from the vessel outwardly through the tank; substantially as described.

In testimony whereof I have hereunto set my hand.

EDWARD DITHRIDGE.

Witnesses:
 SAML. A. ROELOFS,
 ENOCH RUSSELL.